May 6, 1969
B. J. RUTLEDGE
3,442,531
STABILIZING MEANS
Filed March 7, 1968
Sheet 1 of 2
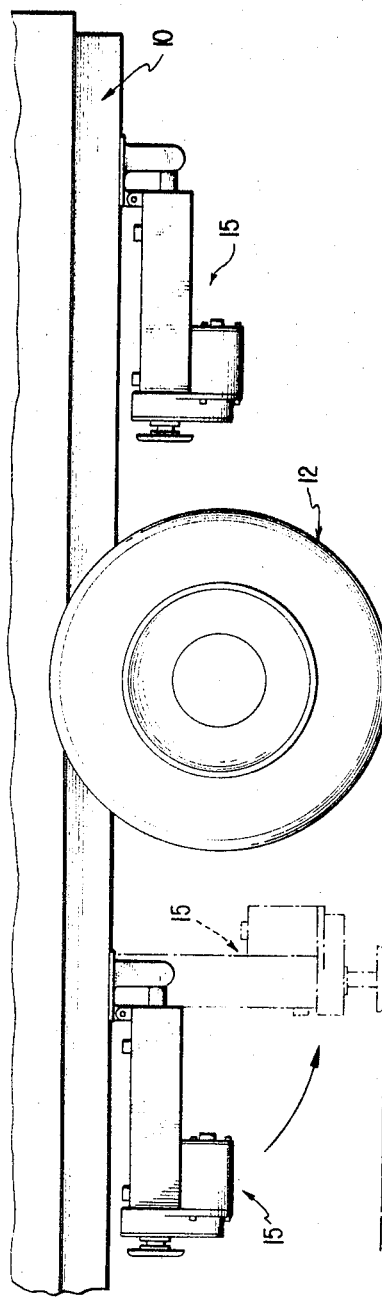
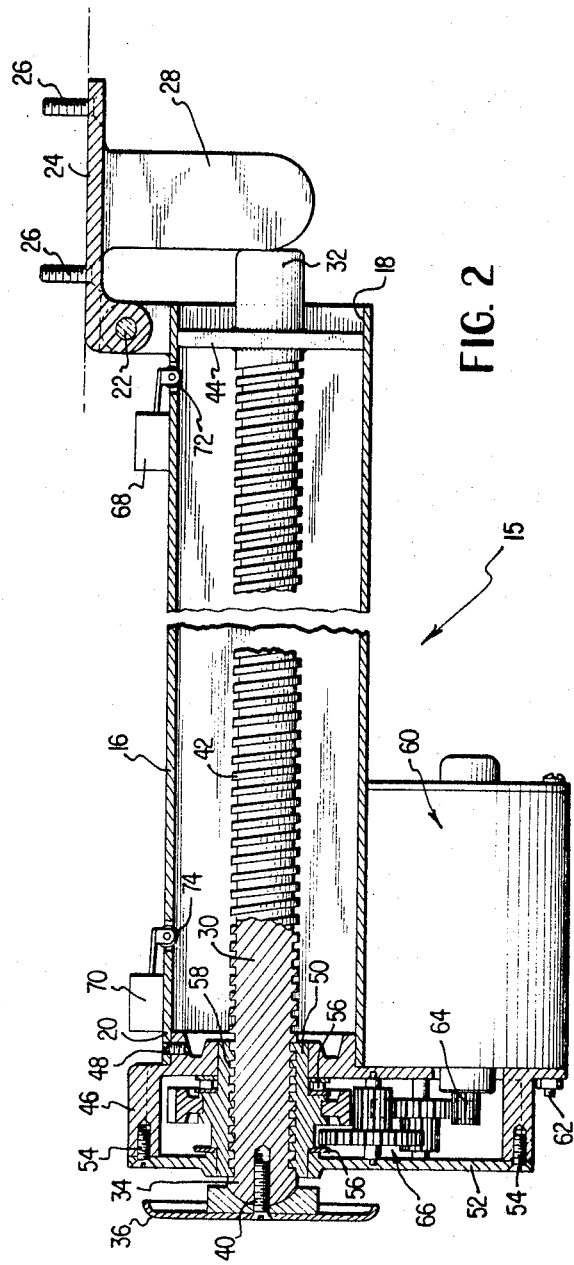
INVENTOR
BENNY JOHN RUTLEDGE
BY *Jacobi & Davidson*
ATTORNEYS May 6, 1969  B. J. RUTLEDGE  3,442,531
STABILIZING MEANS Filed March 7, 1968

INVENTOR
BENNY JOHN RUTLEDGE

BY *Jacobi & Davidson*

ATTORNEYS.

United States Patent Office 3,442,531
Patented May 6, 1969

3,442,531
STABILIZING MEANS
Benny John Rutledge, 2216 9th St.,
Wasco, Calif. 93280
Filed Mar. 7, 1968, Ser. No. 711,449
Int. Cl. B60s 9/08, 9/00
U.S. Cl. 280—150.5
10 Claims

ABSTRACT OF THE DISCLOSURE

Stabilizing means for use with a trailer or the like capable of automatic movement between an out-of-the-way position beneath the trailer when the trailer is attached to a supporting vehicle for traveling, and a stabilizing position wherein a portion of the device engages a supporting surface such as the ground to maintain the bed of the trailer in a generally horizontally extending or other position without the need for the supporting vehicle. A shaft member is axially moved by a motor means or the like within a hollow body member and the upper end of the shaft member engages a cam means when the shaft member has been retracted to pivot the stabilizing means to a generally horizontally extending traveling position with relation to the trailer. On reversal of the motor means, the upper end of the shaft member is moved along the cam means and then out of engagement with the cam means whereby the weight of the stabilizing means functions to lower the same into a generally vertically extending position for supporting the trailer. A modified embodiment includes an automatic means for locking the stabilizing means in its generally vertically extending position, the locking means being automatically disengaged on retraction of the shaft member to permit the stabilizing means to be moved to its generally horizontally extending traveling position.

---

This invention relates to a stabilizing means for a trailer or the like which will function to support the bed of the trailer in a generally horizontally extending position when the trailer is not attached to the vehicle normally used to move the same.

As is well known, trailers are ordinarily supplied with a single pair of wheels and are attached to a vehicle such as a cab or an automobile for movement from one location to another. Since the front end of the trailer is supported during such use, the single set of wheels can function to maintain the bed of the trailer in a generally horizontally extending position. However, it is frequently desired to disengage the trailer from its supporting vehicle either for storage of the trailer or for use of the trailer in a stationary location. When the trailer is disengaged from its supporting vehicle, its single set of wheels cannot function to maintain the trailer bed in a generally horizontally extending position. Thus, when such trailers are removed from their supporting vehicles, one end of the same, generally the front, is permitted to drop into engagement with a supporting surface such as the ground or the like. With this arrangement, obviously the bed cannot be maintained in a generally horizontally extending position. Although in some instances this is not important, it will be readily recognized that many circumstances exist when, even though the trailer is not attached to its supporting vehicle, it is still desired to maintain the bed of the trailer in a generally horizontally extending position. Therefore, various means have been developed heretofore for stabilizing the trailer or supporting the same with its bed in a generally horizontally extending position when the trailer is disengaged from its supporting vehicle. It is this type of device that the instant invention is concerned with.

It should be understood that although the instant inventive concepts are primarily directed to the provision of a stabilizing means for a trailer or the like having a single set of wheels, there are instances in which a vehicle which is normally self-supporting due to the presence of a plurality of pairs of wheels, requires further stabilization during use in a stationary position. The means of the instant invention will also function to provide such further stabilization for a trailer or the like of this construction.

Although the prior art has recognized the need for stabilizing or supporting means for a stationary trailer or the like, the devices suggested heretofore have suffered from one or more disadvantages. Many of the prior art constructions have not been sufficiently stable to support a vehicle such as a trailer for an extended period, particularly when the trailer was used for loading and unloading when unattached to its vehicle support thereby subjecting the stabilizing means to a great deal of stress. Additionally, such prior art devices have generally been relatively difficult to utilize, requiring great effort on the part of the operator to secure the same in operative relationship or to disengage the same when it was subsequently desired to render the trailer movable. Frequently, prior art stabilizing means required individual manual adjustment each time the trailer was to be supported thereby, in many instances necessitating the operator to climb under the trailer either to adjust the stabilizing means or to secure the same in an out-of-the-way position or release the same therefrom. Moreover, many mechanisms utilized heretofore as a supporting mechanism for a trailer or the like were subject to frequent maintenance problems thereby increasing the costs of utilizing such devices and decreasing their reliability.

It will be understood that the aforementioned problems with prior art stabilizing devices are not intended to be all inclusive, but merely illustrative. It is a primary object of the instant invention to provide a stabilizing means for a trailer or the like which is free from the foregoing and other such disadvantages. Further, the instant inventive concepts contemplate the provision of a stabilizing means which can be automatically and remotely actuated by an operator to move the same from an out-of-the-way position underneath the trailer to a stabilizing position. In that same regard, the construction of the instant invention secures the stabilizing means in either its traveling or stabilizing position without any need for manual adjustment.

A further object of the instant invention is to provide a stabilizing device for a trailer or the like which is sturdy and durable in construction whereby, when stabilized, the trailer can be subjected to great stress without any danger of damaging either the trailer or the stabilizing means. Additionally, the construction of the instant invention is extremely reliable in use, while being relatively simple and inexpensive to manufacture and maintain.

Additional features of this invention include the provision of means to lock the stabilizer in a generally vertically extending position with relation to the trailer whereby it cannot be accidentally disengaged, while automatically unlocking the stabilizing means when it is desired to retract the same to a generally horizontally extending position beneath the trailer for traveling.

Other and further objects of the instant invention reside in the combination of elements, arrangement of parts and features of construction. Still other objects will in part be obvious and in part be pointed out as the description of the invention proceeds and as shown in the accompanying drawings wherein:

FIGURE 1 is a side elevational view of a portion of a trailer or the like equipped with stabilizing means according to the instant inventive concepts, the stabilizing means being shown in their out-of-the-way relationship underneath the trailer, with one of the stabilizing means being shown in dotted lines in its stabilizing position;

FIGURE 2 is an enlarged cross-sectional view of one embodiment of a stabilizing means according to the instant inventive concepts, showing the relationship of the parts thereof when the same is out-of-the-way during travel of the trailer, parts being broken away for illustrative convenience;

Figure 4:
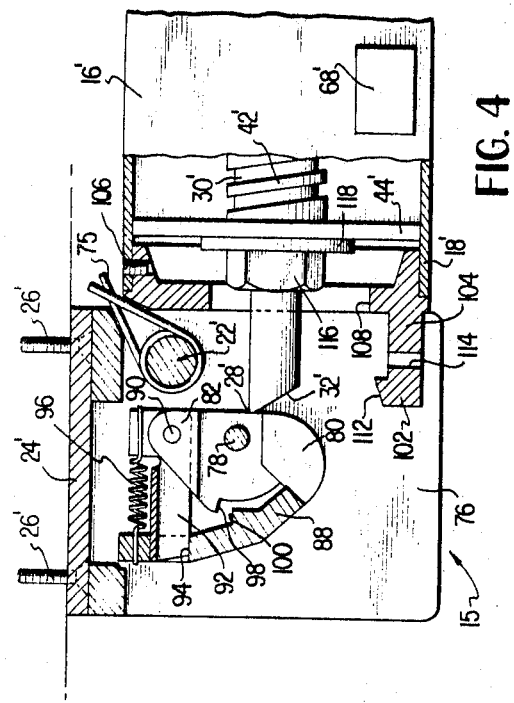
Figure 5:
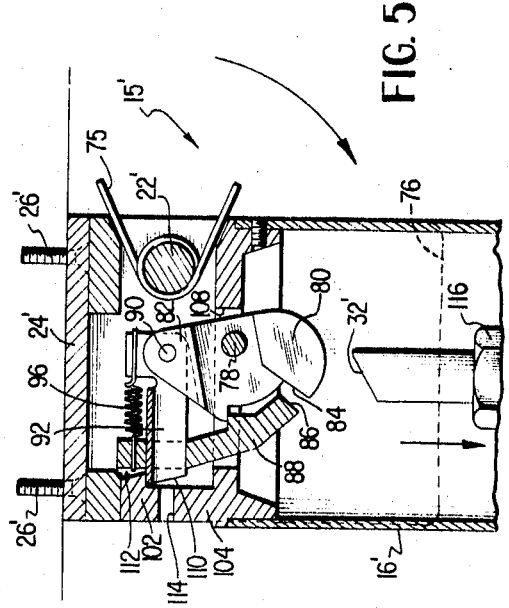

FIGURE 4 is a fragmentary view, partly in cross-section, of the upper portion of a modified stabilizing means according to the instant invention including means for locking the same in its stabilizing position, this figure showing the relationship of the parts thereof with the stabilizing means in the out-of-the-way position; and FIGURE 5 is a fragmentary cross-sectional view of the embodiment of FIGURE 4 showing the relationship of the parts in the locked stabilizing position.

Like reference characters refer to like parts throughout the several views of the drawings.

Figure 3:
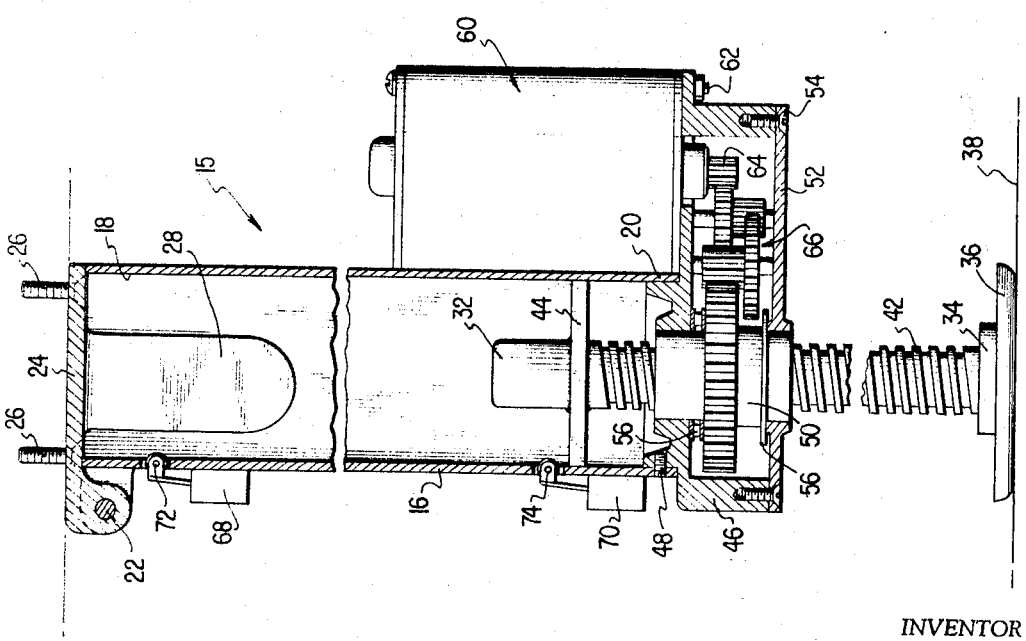
FIGURE 3 is a cross-sectional view of the stabilizing means of FIGURE 2 showing the relationship of the parts when the same is in a position for stabilizing the trailer.

Referring now to the drawings in general, and more particularly to FIGURES 1–3, a portion of a trailer is designated generally by the reference numeral 10 in FIGURE 1, one of the wheel supports therefor being shown at 12. A pair of stabilizing means according to one embodiment of the instant inventive concepts are designated generally by the reference numeral 15 and are shown as mounted on the underside of the trailer 10 to the front and to the rear of the wheel 12. It will be understood that a single stabilizing means 15 can be utilized with a trailer to, in combination with the wheels thereof, stabilize the trailer so that the bed thereof is maintained in a generally horizontally extending position. Further, one or more such stabilizing means can be utilized in conjunction with a trailer or the like having any number of wheels supporting the same. According to the preferred embodiment of the instant invention, a stabilizing means 15 is secured adjacent each corner of a trailer to provide maximum support therefor.

Each stabilizer according to the instant invention as shown in the embodiment of FIGURES 1–3 comprises basically a jacking means movable between a traveling position as shown in FIGURE 2 and in full lines in FIGURE 1 wherein the mechanism is out-of-the-way and a stabilizing position as shown in FIGURE 3 and in dotted lines in FIGURE 1. The jacking means includes a hollow body member 16 having a non-circular interior, square in cross-section in the illustrated embodiment. The body member 16 has an open upper end 18 and a lower end 20 with pivot means 22 securing the body member 16 adjacent the upper end 18 to a bracket 24 which may be attached by bolts or the like 26 to the underside of the trailer 10. It will be understood that the body member 16 may be pivotally secured directly to the underside of the trailer 10, rather than using a bracket 24, but for convenience, the jacking means incorporates a bracket 24 which also carries a cam means 28 for a purpose to be described in more detail hereinafter.

A shaft member 30 is carried at least partially within the body member 16 and includes an upper end 32 defining a cam-following surface for engaging the cam means 28 and a lower end 34 carrying a base plate 36 adapted for engagement with a supporting surface such as the ground or the like 38 when the jacking means is in its stabilizing position. Although the base plate 36 has been shown as fixedly secured by a screw 40 to the lower end 34 of the shaft member 30, it will be understood that the base plate 36 can be universally mounted on the lower end 34 of the shaft member 30 to accommodate slight variations in the grade of the supporting surface 38.

The shaft member 30 has an external thread means 42 defined over a major extent of its length with a guide plate 44 fixed in outstanding relationship adjacent the upper end 32 thereof and adapted to slidingly engage the interior of the body member 16 during movement of the shaft member 30 with respect to the body member 16 in a manner and for a purpose to be described in more detail hereinafter.

A casing 46 is fixedly secured as by screws 48 to the lower end 20 of the body member 16. A sleeve member 50 is rotatably supported between the casing 46 and a cover 52 removably secured to the casing 46 as by screws 54 or the like. Any desired bearing means schematically shown at 56 may be provided to permit rotation of the sleeve member 50 while precluding axial movement thereof with respect to the body member 16. The sleeve member 50 includes internal thread means 58 cooperatively engaging the external thread means 42 on the shaft member 30 whereby rotation of the sleeve member 50 moves the shaft member 30 axially of the body member 16 between a retracted position as shown generally in FIGURE 2 and an extended position as shown generally in FIGURE 3.

The sleeve member 50 is rotated by a reversible motor means 60 secured as by bolts 62 to a portion of the casing 46 with an output shaft 64 of the motor means 60 disposed within the cavity defined by the casing 46 and its cover 52. Any conventional gear reduction means schematically shown at 66 operatively interconnects the output shaft 64 of the motor means 60 with the sleeve member 50.

The use and operation of a stabilizing means such as shown in FIGURES 1–3 will now be readily understood. Individual remote control (not shown) for the motor means 60 of each stabilizing means 15 may be provided at any desired location either on the trailer 10 or on the supporting vehicle therefor (not shown). With the shaft member 30 in its fully retracted position as shown in FIGURE 2, the cam-engaging surface on the upper end 32 of the shaft member 30 bears against the side of the cam means 28 to preclude downward pivotal movement of the body member 16 and thus the various elements associated therewith about the pivot means 22. In this relationship the body member 16 extends in a generally horizontal relationship with respect to the bracket member 24 and thus the trailer 10 whereby it is out-of-the-way when the trailer is traveling on its wheels. On energizing the reversible motor means 60 in one direction, the sleeve member 50 is rotated through the operative engagement of the output shaft 64 of the motor means 60 and the gear reduction means 66 therewith to move the upper end 32 of the shaft member 30 toward the lower end 20 of the body member 16. As the upper end 32 of the shaft member 30 moves toward the lower end 20 of the body member 16, the cam-following surface thereof rides on the cam means 28 permitting the body member 16 to rotate about the pivot means 22 under the influence of gravity until the body member 16 assumes a generally vertically extending relationship with respect to the trailer 10. Further rotation of the sleeve member 50 in this same direction moves the cam-following surface at the upper end 32 of the shaft member 30 completely out of engagement with the cam means 28 until the shaft member has reached its fully extended position at which point the base plate 36 engages the supporting surface 38 as shown in FIGURE 3.

In order to return the jacking means 15 to its out-of-the-way traveling position with respect to the trailer 10, the motor means 60 is energized to rotate its output shaft 64 in a reverse direction whereby the sleeve 50 is rotated to raise the shaft member 30 until the cam-following surface on the upper end 32 thereof engages the cam means 28. Further movement of the shaft member 30 toward its retracted position forces the body member 16 and, thus, the rest of the jacking means 15 associated therewith to rotate about the pivot means 22 until the same is positioned in its generally horizontally extending, traveling relationship.

If desired, an upper limit switch means 68 and a lower limit switch means 70 may be carried by the body member 16 and operatively associated in any conventional manner with the circuit of the motor means 60 to automatically deenergize the motor means 60 when the shaft member 30 has been moved to either of its extreme positions. In the embodiment shown in the drawings, the switch members 72, 74 of the switch means 68, 70 respectively are engaged by the guide plate 44 when the shaft member 30 reaches either its fully retracted or its fully extended position. Of course, the remote control for the motor means 60 can be readily designed by those with ordinary skill in the art to automatically overcome either or both of the limit switch means 68, 70 to permit any desired degree of retraction or extension of the shaft member 30 on each stabilizing means 15. In this manner, if desired, a two-way level (not shown) may be mounted on the tongue of the trailer 10 and, for example, if a stabilizing means 15 is utilized on each corner of the trailer 10, the individual stabilizing means can be readily adjusted to accommodate any variation in levels of the supporting surface 38.

Additionally, although the stabilizing means 15 is shown in dotted lines in FIGURE 1 as supporting the trailer 10 with the wheel 12 in engagement with the supporting surface 38, by using a sufficiently strong motor and by permitting relative rotation between the shaft member 30 and the base plate 36, the stabilizing means can be actuated to completely raise the trailer 10 to a level wherein the wheels do not engage the supporting surface 38 and the trailer is fully supported by the stabilizing means themselves.

Referring now particularly to FIGURES 4 and 5 a further modification of the instant inventive concepts is shown wherein the stabilizer is provided with means to lock the same with the body member in the generally vertically extending or stabilizing position. In this embodiment, parts similar to the embodiments of FIGURES 1–3 have been designated by the same reference numerals followed by a prime (').

In this embodiment the pivot means 22' includes spring means 75 which function to further urge the body member 16' toward its generally vertically extending position as shown in FIGURE 5. Such spring means may be utilized in the embodiment of FIGURES 1–3, if desired, although it has been found that the force of gravity is generally adequate to lower the body member 16 and its related parts as the shaft member is moved to its extended position.

The bracket member 24' in the embodiment of FIGURES 4 and 5 includes a depending portion 76 which carries the pivot means 22' and further includes an additional pivot means 78 for supporting the cam means 28' intermediate its lower portion 80 and its upper portion 82. The lower portion 80 of the cam means 28' has a camming surface for operative engagement with a cam-following surface on the upper end 32' of the shaft member 30'. However, initial engagement of the cam-following surface on the upper end 32' of the shaft member 30' rocks the cam means 28' about the pivot means 78 in a clockwise direction from the relationship shown in FIGURE 5 to the relationship shown in FIGURE 4 wherein the edge 84 of the cam means 28' engages a first stop means 86 on an element 88 carried by the bracket means 24'. Once surface 84 has engaged the first stop means 86, further retraction of the shaft member 30' in the manner described with reference to FIGURES 1–3 will function to rotate the body member 16' and its associated elements about the pivot means 22' to the traveling position as shown in FIGURE 4.

The function of the initial rocking of the cam means 28' will now be further explained. Pivotally attached at 90 to the upper portion 82 of the cam means 28' is an L-shaped locking pin 92, one portion of which is slidingly supported within an aperture 94 in the element 88 and the other portion of which is engaged by one end of a spring means 96, the other end of the spring means 96 being secured to a fixed element, for example, the element 88, to normally urge the locking pin 92 through the aperture 94 to the position shown in FIGURE 5. Presuming the upper end 32' of the shaft member 30' is not in engagement with the lower portion 80 of the cam means 28', the spring means 96 is capable of rocking the cam means 28' about the pivot means 78 thereby permitting the locking pin 92 to be pushed through the aperture 94. The extent of this movement of the locking pin 92 is limited by engagement of surface 98 of the cam means 28' with a second stop means 100 on the element 88.

When the locking pin 92 is moved through the aperture 94 in the element 88 it is capable of lockingly engaging a locking detent 102 on a locking member 104 fixedly secured as by screws or the like 106 to the upper end 18' of the body member 16'. The locking member 104 has a central opening 108 capable of by-passing the cam means 28' and the element 88. It will be noted that the surfaces 110 and 112 of the locking pin 92 and the locking detent 102, respectively, are inclined whereby the locking detent can press the locking pin 92 inwardly against the action of the spring means 96 to effect the desired locking engagement. Additionally, an opening 114 is provided in the locking member 104 to permit insertion of a pin or the like for manually disengaging the locking pin 92, if desired.

Although the locking pin 92 can be manually disengaged as indicated, in ordinary use of the stabilizing means 15' the locking pin 92 is automatically withdrawn to disengage the same from the locking detent 102 when the cam-following surface on the upper end 32' of the shaft member 30' initially engages the lower portion 80 of the cam means 28' and rocks the same clockwise as shown in FIGURES 4 and 5. The cam-following surface on the upper end 32' of the shaft member 30' and the camming surface on the lower portion 80 of the cam means 28' can be readily designed to provide this initial rocking motion of the cam means 28' about the pivot means 78 until the surface 84 engages the first stop means 86 whereby the locking means is disengaged before the further retraction of the shaft member 30' causes rotation of the body member 16' and its associated elements about the pivot means 22' in the manner described previously.

Thus, it will be seen with the embodiment of FIGURES 4 and 5 that although the stabilizing means is locked in its stabilizing position, it is automatically unlocked when the device is operated to move the same to its traveling position. This automatic locking and unlocking feature provides obvious advantages and additional stability to the construction shown in FIGURES 4 and 5.

The only additional difference between the embodiment of FIGURES 4 and 5 and the embodiment of FIGURES 1–3, as shown in the drawings is the use of a nut 116 and washer 118 for securing the non-circular or square guide plate 44' on the shaft member 30'. This arrangement may be utilized in place of the welded construction shown in FIGURES 1–3, if desired.

It will now be seen that there is herein provided an improved stabilizing means for a trailer or the like which satisfies all of the objectives of the instant invention, and others, including many advantages of great practical utility and commercial importance.

Since many embodiments may be made of the instant inventive concepts, and since many modifications may be made of the embodiments hereinbefore shown and described, it is to be understood that all matter herein is to be interpreted merely as illustrative and not in a limiting sense.

What is claimed is:

1. For use in stabilizing a trailer or the like, a jacking means movable between a traveling position and a stabilizing position with respect to a trailer, said jacking means comprising a hollow body member having an upper end and a lower end, pivot means securing said body member to a trailer adjacent said upper end of said hollow body member for movement between a generally horizontally extending position with respect to the trailer when said jacking means is in said traveling position and a generally vertically extending position with respect to a trailer when said jacking means is in said stabilizing position, a shaft member carried at least partially within said body member and having an upper end and a lower end, actuating means for moving said shaft member axially of said body member between a retracted position wherein said upper end of said shaft member is juxtaposed to said upper end of said body member and an extended position wherein said upper end of said shaft member is moved toward said lower end of said body member, a cam-following surface on said upper end of said shaft member, and a cam means juxtaposed to said upper end of said body member and fixedly secured with respect to the trailer, said cam-following surface operatively engaging said cam means when said shaft member is moved toward said retracted position to thereby move said body member about said pivot means into said generally horizontally extending position, and said body member being urged toward said generally vertically extending position as said shaft member is moved toward said extended position.

2. In combination, a trailer including a plurality of jacking means according to claim 1 secured at spaced locations with respect to the underside of said trailer.

3. The structure of claim 1 wherein said lower end of said shaft member includes a base plate adapted for engagement with a supporting surface when said jacking means is in said stabilizing position.

4. The structure of claim 1 wherein said actuating means includes a reversible motor means carried by said body member and having an output shaft, said shaft member having an external thread means defined over a major extent of its length, a sleeve member rotatably carried by said body member and fixed against axial movement with respect to said body member, said sleeve member including internal thread means cooperatively engaging said external thread means on said shaft member, and gear means operatively interconnecting said output shaft of said motor means with said sleeve member for rotation of said sleeve member whereby said shaft member is moved between said retracted position and said extended position with respect to said body member.

5. The structure of claim 1 further including an upper limit switch means and a lower limit switch means carried by said body member, said upper limit switch means being operatively connected to said actuating means to stop further upward movement of said shaft member when said shaft member has been moved to said retracted position and said lower limit switch means being operatively connected to said actuating means to stop further downward movement of said shaft member when said shaft member has been moved to said extended position.

6. The structure of claim 5 wherein said shaft member includes a guide plate fixed adjacent its upper end and slidingly engaging the interior of said body member during movement of said shaft member between said retracted position and said extended position, said guide plate operatively engaging said upper limit switch means when said shaft member has been moved to said retracted position and operatively engaging said lower limit switch means when said shaft member has been moved to said extended position.

7. The structure of claim 1 further including a locking means operatively engaging said body member when said body member is in said generally vertically extending position to secure said jacking means in said stabilizing position, said locking means being automatically disengaged as said shaft member is moved toward said retracted position to permit said body member to be moved to said generally horizontally extending position.

8. The structure of claim 7 wherein said cam means includes an upper portion and a lower portion, said lower portion including a camming surface operatively engaged by said cam-following surface on said upper end of said shaft member as said shaft member is moved toward said retracted position, said cam means being pivotally supported intermediate said upper and lower portions thereof, and a locking pin pivotally secured to said upper portion of said cam means, spring means normally urging said locking pin toward a locking position, and a locking detent carried by said body member and lockingly engaging said locking pin when said body member is in said vertically extending position, said cam-following surface on said upper end of said shaft member initially rocking said cam means about its pivotal support to withdraw said locking pin from locking engagement with said locking detent against the force of said spring means as said shaft member is moved toward said retracted position, and stop means to preclude further rocking movement of said cam means about its pivotal support when said locking pin has been withdrawn from locking engagement with said locking detent, whereby further movement of said shaft member toward said retracted position moves said body member to said generally horizontally extending position.

9. The structure of claim 1 wherein said lower end of said shaft member includes a base plate adapted for engagement with a supporting surface when said jacking means is in said stabilizing position, said actuating means including a reversible motor means carried by said body member and having an output shaft, said shaft member having an external thread means defined over a major extent of its length, a sleeve member rotatably carried by said body member and fixed against axial movement with respect to said body member, said sleeve member including internal thread means cooperatively engaging said external thread means on said shaft member, and gear means operatively interconnecting said output shaft of said motor means with said sleeve member for rotation of said sleeve member whereby said shaft member is moved between said retracted position and said extended position with respect to said body member, an upper limit switch means and a lower limit switch means carried by said body member, said upper limit switch means being operatively connected to said motor means to stop further upward movement of said shaft member when said shaft member has been moved to said retracted position and said lower limit switch means being operatively connected to said motor means to stop further downward movement of said shaft member when said shaft member has been moved to said extended position, a guide plate fixed adjacent said upper end of said shaft member and slidingly engaging the interior of said body member during movement of said shaft member between said retracted position and said extended position, said guide plate operatively engaging said upper limit switch means when said shaft member has been moved to said retracted position and operatively engaging said lower limit switch means when said shaft member has been moved to said extended position.

10. The structure of claim 9 further including a locking means operatively engaging said body member when said body member is in said generally vertically extending position to secure said jacking means in said stabilizing position, said locking means being automatically disengaged as said shaft member is moved toward said retracted position to permit said body member to be moved to said generally horizontally extending position, said cam means including an upper portion and a lower portion, said lower portion including a camming surface operatively engaged by said cam-following surface on said upper end of said shaft member as said shaft member is moved toward said retracted position, said cam means being pivotally supported intermediate said upper and lower portions thereof, and a locking pin pivotally secured to said upper portion of said cam means, spring means normally urging said locking pin toward a locking position, and a locking detent carried by said body member and lockingly engaging said locking pin when said body member is in said vertically extending position, said cam-following surface on said upper end of said shaft member initially rocking said cam means about its pivotal support to withdraw said locking pin from locking engagement with said locking detent against the force of said spring means as said shaft member is moved toward said retracted position, and stop means to preclude further rocking movement of said cam means about its pivotal support when said locking pin has been withdrawn from locking engagement with said locking detent, whereby further movement of said shaft member toward said retracted position moves said body member to said generally horizontally extending position.

References Cited

UNITED STATES PATENTS

| | | | |
|---|---|---|---|
| 2,159,395 | 5/1939 | Mersereau | 280—150.5 |
| 2,885,181 | 5/1959 | McCully | 254—86 |
| 3,093,362 | 6/1963 | Schaefer | 280—150.5 |

KENNETH H. BETTS, *Primary Examiner.*

ROBERT R. SONG, *Assistant Examiner.*

U.S. Cl. X.R.

254—86